United States Patent
Wang et al.

(10) Patent No.: US 11,777,424 B2
(45) Date of Patent: Oct. 3, 2023

(54) METHOD FOR DETERMINING INITIAL ROTOR POSITION OF PERMANENT MAGNET SYNCHRONOUS MOTOR ACCORDING TO PHASE CURRENT DIFFERENCES AND LINE CURRENT DIFFERENCES AND ASSOCIATED MOTOR DEVICE

(71) Applicant: Elite Semiconductor Microelectronics Technology Inc., Hsinchu (TW)

(72) Inventors: Shih-Chieh Wang, Hsinchu (TW);
Yong-Yi Jhuang, Hsinchu (TW);
Ming-Fu Tsai, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 128 days.

(21) Appl. No.: 17/494,855

(22) Filed: Oct. 6, 2021

(65) Prior Publication Data

US 2023/0114056 A1  Apr. 13, 2023

(51) Int. Cl.
*H02P 6/00* (2016.01)
*H02P 6/18* (2016.01)

(52) U.S. Cl.
CPC .......... *H02P 6/186* (2013.01); *H02P 2207/05* (2013.01)

(58) Field of Classification Search
CPC .............................. H02P 6/186; H02P 2207/05
USPC ..................................................... 318/400.32
See application file for complete search history.

(56) References Cited

U.S. PATENT DOCUMENTS

| | | | | |
|---|---|---|---|---|
| 2010/0225262 A1* | 9/2010 | Matsuo | ................... | H02P 6/185 318/400.33 |
| 2011/0074327 A1* | 3/2011 | Paintz | ..................... | H02P 6/182 318/400.35 |
| 2011/0109255 A1* | 5/2011 | Bonvin | ................... | H02P 6/185 318/400.33 |
| 2011/0285337 A1* | 11/2011 | Taniguchi | ............... | H02P 21/24 318/400.34 |
| 2014/0035502 A1* | 2/2014 | Wang | ..................... | H02P 21/32 318/400.37 |
| 2017/0082419 A1* | 3/2017 | Li | ............................ | H02P 6/20 |

* cited by examiner

*Primary Examiner* — Kawing Chan
*Assistant Examiner* — Gabriel Agared
(74) *Attorney, Agent, or Firm* — Winston Hsu

(57) ABSTRACT

A method for determining an initial rotor position of a permanent magnet synchronous motor (PMSM) includes: generating a plurality of transient currents by applying a plurality of voltages to each phase stator winding of a three phase stator winding of the PMSM; generating three phase current differences according to the plurality of transient currents; determining a first zone in which the initial rotor position of the PMSM is located according to the three phase current differences, wherein angles between 0-360 degrees are divided into a plurality of zones, and the first zone is selected from the plurality of zones; calculating three line current differences according to the three phase current differences; and determining the initial rotor position of the PMSM according to the first zone and the three line current differences.

8 Claims, 6 Drawing Sheets

METHOD FOR DETERMINING INITIAL ROTOR POSITION OF PERMANENT MAGNET SYNCHRONOUS MOTOR ACCORDING TO PHASE CURRENT DIFFERENCES AND LINE CURRENT DIFFERENCES AND ASSOCIATED MOTOR DEVICE

BACKGROUND OF THE INVENTION

1. Field of the Invention

The present invention is related to a permanent magnet synchronous motor (PMSM), and more particularly, to a method for determining an initial rotor position of the PMSM according to phase current differences and line current differences and an associated motor device.

2. Description of the Prior Art

Generally speaking, a PMSM is composed of a multiphase stator winding (e.g. a three phase stator winding) and a rotor (e.g. a permanent magnet). In order to save costs and improve robustness, a position sensor (e.g. a hall sensor) is usually not installed on the PMSM, and it is necessary to drive the PMSM with a typical sensorless driving method. For the typical sensorless driving method, since an initial rotor position of the PMSM is random and unknown, the rotor may reverse when the PMSM is started. For some applications such as ceiling fans and hard disk drives, the phenomenon of rotor reversal is not allowed to occur since it may cause the PMSM to start too slowly or reduce the service life of the applications. As a result, an innovative method for determining the initial rotor position of the PMSM that can effectively prevent the rotor reversal when the PMSM is started is urgently needed.

SUMMARY OF THE INVENTION

It is therefore one of the objectives of the present invention to provide a method for determining an initial rotor position of a PMSM according to phase current differences and line current differences and an associated motor device, to address the above-mentioned problems.

According to one embodiment of the present invention, a method for determining an initial rotor position of a PMSM is provided. The method may include: generating a plurality of transient currents by applying a plurality of voltages to each phase stator winding of a three phase stator winding of the PMSM; generating three phase current differences according to the plurality of transient currents; determining a first zone in which the initial rotor position of the PMSM is located according to the three phase current differences, wherein angles between 0-360 degrees are divided into a plurality of zones, and the first zone is selected from the plurality of zones; calculating three line current differences according to the three phase current differences; and determining the initial rotor position of the PMSM according to the first zone and the three line current differences.

According to another embodiment of the present invention, a motor device is provided. The motor device includes a permanent magnet synchronous motor (PMSM) and a processing circuit. The processing circuit is arranged to apply a plurality of voltages to each phase stator winding of a three phase stator winding of the PMSM, to obtain a plurality of transient currents from the PMSM, generate three phase current differences according to the plurality of transient currents, determine a first zone in which the initial rotor position of the PMSM is located according to the three phase current differences, calculate three line current differences according to the three phase current differences, and determine an initial rotor position of the PMSM according to the first zone and the three line current differences, wherein angles between 0-360 degrees are divided into a plurality of zones, and the first zone is selected from the plurality of zones.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
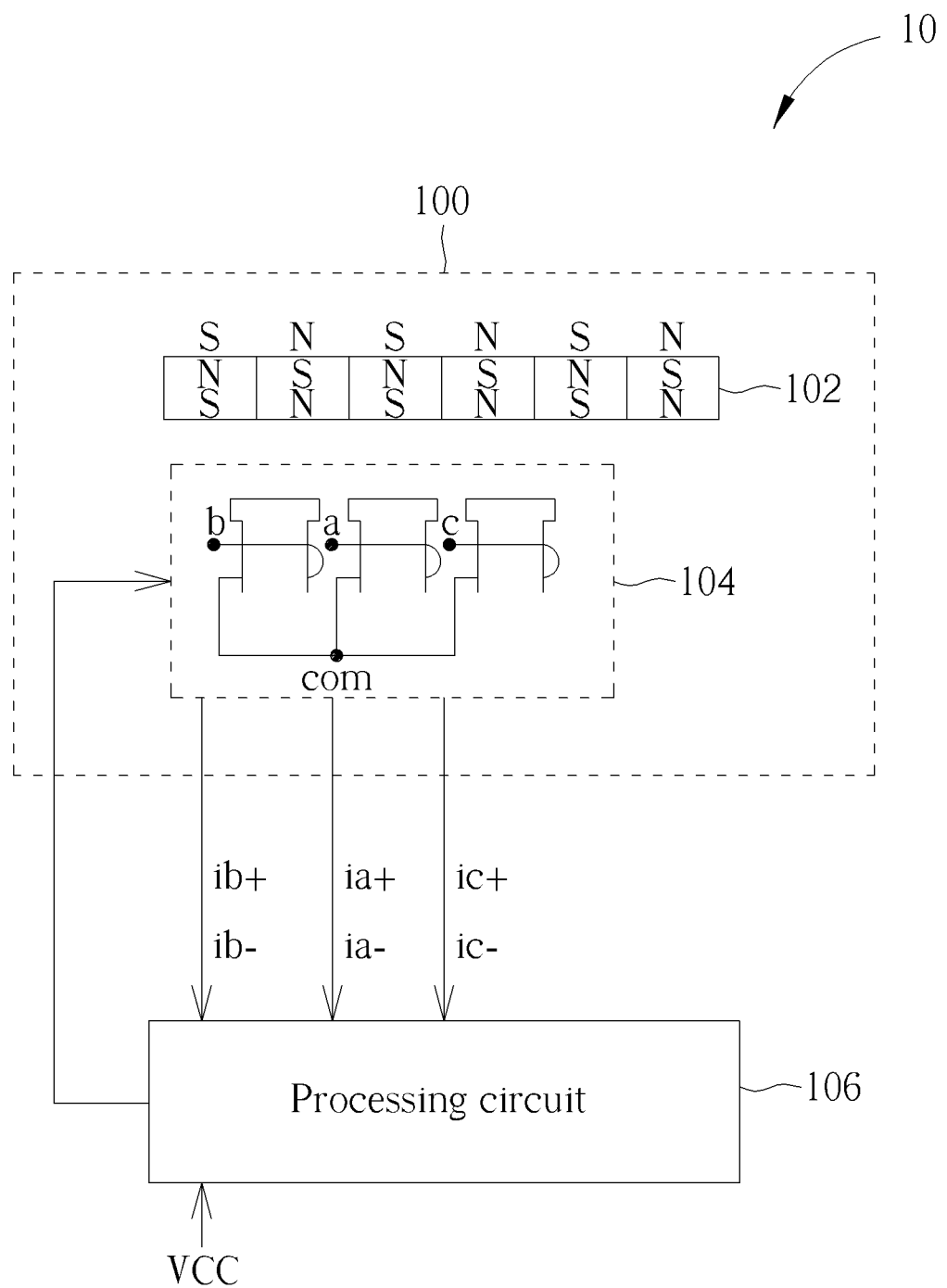
FIG. 1 is a diagram illustrating relative position of rotor and stator of a permanent magnet synchronous motor (PMSM) included in a motor device according to an embodiment of the present invention.

FIG. 1 is a diagram illustrating relative position of a rotor 102 and a stator 104 of a permanent magnet synchronous motor (PMSM) 100 included in a motor device 10 according to an embodiment of the present invention. The motor device 10 may include the PMSM 100 and a processing circuit 106, wherein the processing circuit 106 may be coupled to the PMSM 100. The PMSM 100 (e.g. the 9 slot 12 pole PMSM) may include the rotor 102 and the stator 104, wherein the rotor 102 is a permanent magnet, and the stator 104 is a three phase stator winding. The stator 104 may have a Y-connection structure or a delta-connection structure, and may include a stator winding a, a stator winding b, a stator winding c, and a neutral point com. In this embodiment, the stator 104 has the Y-connection structure, but the present invention is not limited thereto.

In order to determine an initial rotor position of the PMSM 100, three phase current differences are generated first, wherein the three phase current differences may include a first phase current difference $\Delta ia$ corresponding to the stator winding a, a second phase current difference $\Delta ib$ corresponding to the stator winding b, and a third phase current difference $\Delta ic$ corresponding to the stator winding c. Specifically, the processing circuit 106 of the motor device 10 applies a plurality of voltages to each phase stator winding of a three phase stator winding of the PMSM 100, to obtain a plurality of transient currents from the PMSM 100. The stator winding a is first magnetized by applying two-thirds of a supply voltage VCC to the stator winding a $$\left(\text{i.e. } V_{acom} = \frac{2}{3}V_{cc}\right)$$

for a period of time t0, to generate a positive transient current ia+(t0), wherein the supply voltage VCC is applied to the processing circuit 106. Then, after three phase current is completely dissipated to 0 by turning off a pulse-width modulation (PWM) of the PMSM 100, the stator winding a is magnetized again by applying two-thirds of negative of the supply voltage VCC to the stator winding a $$\left(\text{i.e. } V_{acom} = \frac{2}{3}V_{cc}\right)$$

for the period of time t0, to generate a negative transient current ia−(t0). The first phase current difference Δia may be generated at the processing circuit 106 by subtracting the negative transient current ia−(t0) from the positive transient current Δia+(t0) (i.e. Δia=ia+(t0)−ia−(t0)).

In the same way, the second phase current difference Δib and the third phase current difference Δic may be generated at the processing circuit 106. By way of example, but not limitation, the processing circuit 106 may be equipped with analog-to-digital conversion capability and digital signal processing capability. For brevity, similar description is omitted here. It should be noted that, in the process of generating positive and negative transient current of each stator winding, the PMSM 100 is not allowed to rotate. In this embodiment, for the relative position of the rotor 102 and the stator winding a, the first phase current difference Δia is larger than 0 (i.e. Δia>0) and larger than the second phase current difference Dib and the third phase current difference Δic. For the relative position of the rotor 102 and the stator winding b, the second phase current difference Δib is smaller than 0 (i.e. Δib<0). For the relative position of the rotor 102 and the stator winding c, the third phase current difference Δic is smaller than 0 (i.e. Δic<0).

Figure 2:
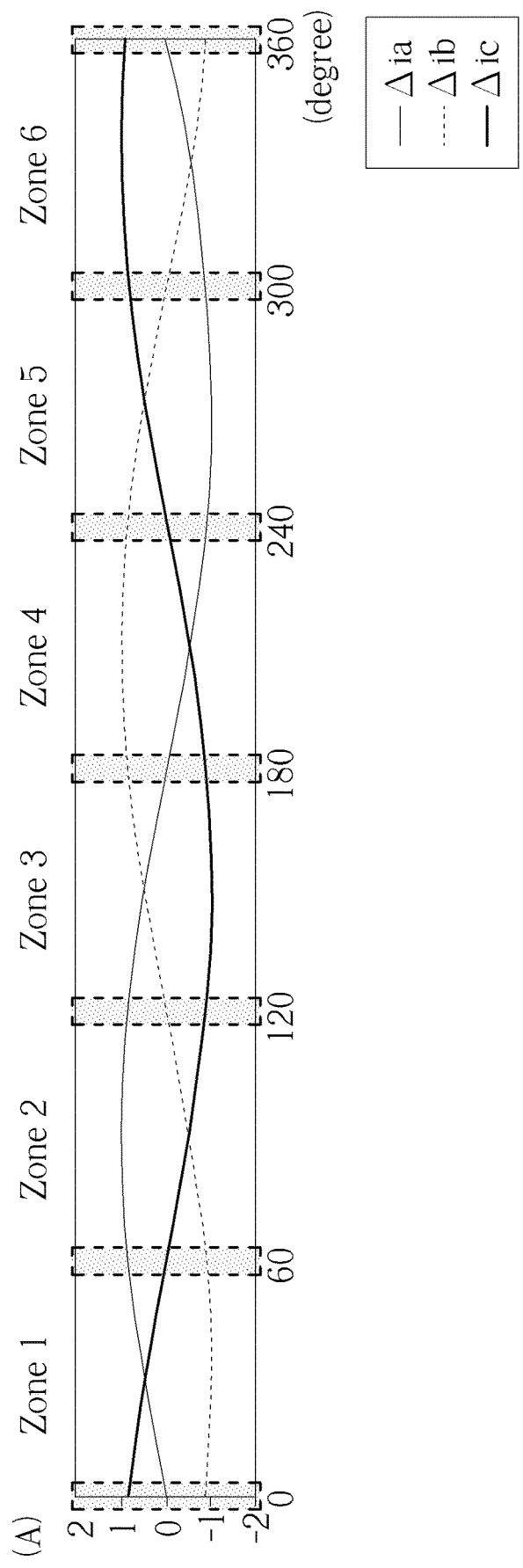
FIG. 2 is a diagram illustrating relationship between three phase current differences and an initial rotor position of a PMSM according to an embodiment of the present invention.

In light of the above, according to a relationship between the signs of the first phase current difference Δia, the second phase current difference Δib, and the third phase current difference Δic, the initial rotor position of the PMSM 100 when the PMSM 100 is started may be preliminarily determined according to an embodiment of the present invention. FIG. 2 is a diagram illustrating relationship between three phase current differences and an initial rotor position of a PMSM according to an embodiment of the present invention. As shown in FIG. 2, angles between 0-360 degrees are divided into a plurality of zones (e.g. zones 1-6), and each of the zones 1-6 is a 60-degree zone.

TABLE 1

| Zone 1<br>0-60 | Zone 2<br>60-120 | Zone 3<br>120-180 | Zone 4<br>180-240 | Zone 5<br>240-300 | Zone 6<br>300-360 |
|---|---|---|---|---|---|
| Δia ≥ 0 | Δia > 0 | Δia > 0 | Δia ≤ 0 | Δia < 0 | Δia < 0 |
| Δib < 0 | Δib < 0 | Δib ≥ 0 | Δib > 0 | Δib > 0 | Δic ≤ 0 |
| Δic > 0 | Δic ≤ 0 | Δic < 0 | Δic < 0 | Δic ≥ 0 | Δic > 0 |

Table 1 illustrates relationship between an initial rotor position (i.e. a rotor angle) of a PMSM and the signs of the first phase current difference Δia, the second phase current difference Δib, and the third phase current difference Δic. A first zone FZ in which the initial rotor position of the PMSM is located may be determined according to the three phase current differences and Table 1. For example, Table 1 is be recorded in a storage component (not shown) of the processing circuit 106, and the first zone FZ is selected from the zones 1-6 by the processing circuit 106, and is later referenced by the processing circuit 106 to find a second zone SZ that is a partial zone within the first zone FZ. For the PMSM 100 shown in FIG. 1, since the first phase current difference Δia is larger than 0 (i.e. Δia>0), the second phase current difference Δib is smaller than 0 (i.e. Δib<0), and the third phase current difference Δic is smaller than 0 (i.e. Δic<0), the first zone FZ of the PMSM 100 may be determined to be as the zone 2. For brevity, similar descriptions for Table 1 are not repeated in detail here.

However, since the resolution of electrical angle in each zone of Table 1 is only 60 degrees and waveforms of three phase current differences are not necessarily complete sine waves, the first zone FZ may be determined inaccurately on zone boundaries of the 6 zones (the dotted-line regions in FIG. 2). In addition, since the initial rotor position of the PMSM 100 may be determined inaccurately according to the three phase differences only, when the stator of the PMSM 100 is magnetized, the rotor of the PMSM 100 may easily reverse when the PMSM 100 is started. To address this issue, the processing circuit 106 is further arranged to fine tune the initial rotor position determination by calculating three line current differences according to the three phase current differences.

Figure 3:
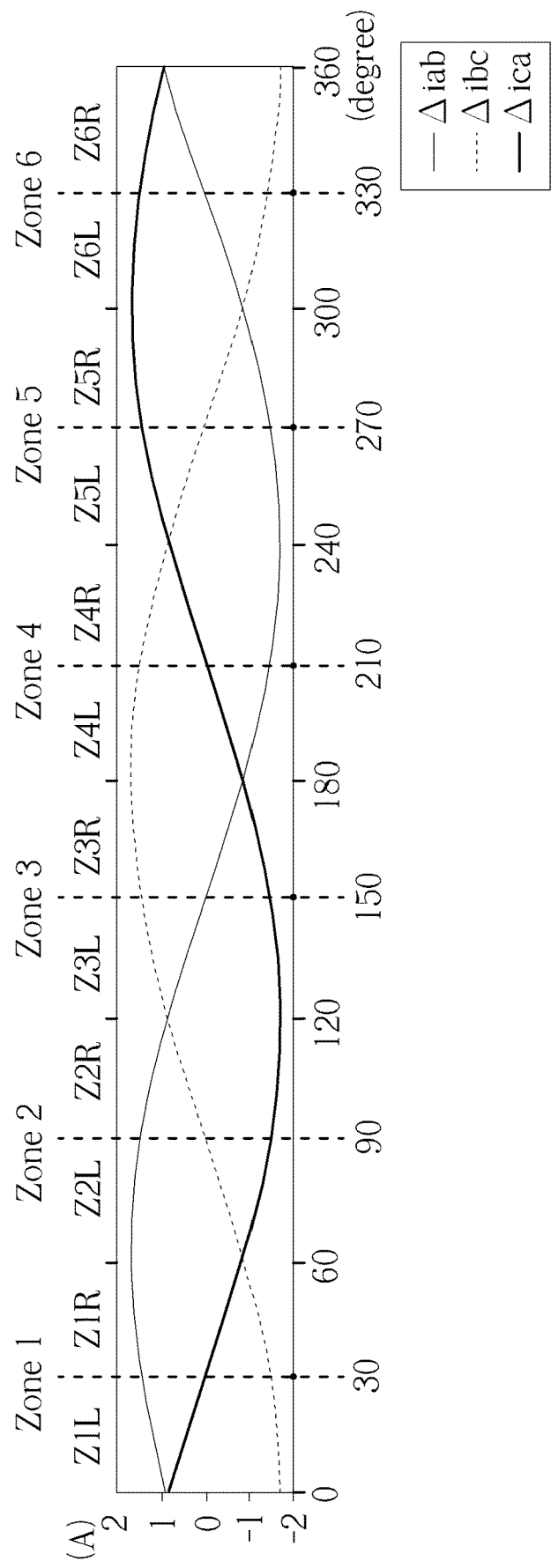
FIG. 3 is a diagram illustrating relationship between three line current differences and an initial rotor position of a PMSM according to an embodiment of the present invention.

FIG. 3 is a diagram illustrating relationship between three line current differences and an initial rotor position of a PMSM according to an embodiment of the present invention. As shown in FIG. 3, the three line current differences may include a first line current difference Δiab, a second line current difference Δibc, and a third line current difference Δica, wherein the first line current difference Δiab is generated by subtracting the second phase current difference Dib from the first phase current difference Δia (i.e. Δiab=Δia−Δib), the second line current difference Δibc is generated by subtracting the third phase current difference Δic from the second phase current difference Δib (i.e. Δibc=Δib−Δic), and the third line current difference Δica is generated by subtracting the first phase current difference Δia from the third phase current difference Δic (i.e. Δica=Δic−Δia). According to the signs of the first line current difference Δiab, the second line current difference Δibc, and the third line current difference Δica, each of the zones 1-6 in Table 1 may be divided into a left 30-degree partial zone and a right 30-degree partial zone, to generate 12 zones Z1L, Z1R, Z2L, Z2R, Z3L, Z3R, Z4L, Z4R, Z5L, Z5R, Z6L, and Z6R. In this embodiment, the processing circuit 106 is arranged to determine the second zone SZ in which the initial rotor position of the PMSM is located as one of the 12 zones according to the first zone FZ and the three line current differences Δiab, Δibc, and Δica.

TABLE 2

| | Zone 1 | | Zone 2 | | Zone 3 | |
|---|---|---|---|---|---|---|
| | Z1L | Z1R | Z2L | Z2R | Z3L | Z3R |
| | Δiab > 0 | Δiab > 0 | Δiab > 0 | Δiab > 0 | Δiab ≥ 0 | Δiab < 0 |
| | Δibc < 0 | Δibc < 0 | Δibc ≤ 0 | Δibc > 0 | Δibc > 0 | Δibc > 0 |
| | Δica ≥ 0 | Δica < 0 | Δica < 0 | Δica < 0 | Δica < 0 | Δica < 0 |

TABLE 3

| | Zone 4 | | Zone 5 | | Zone 6 | |
|---|---|---|---|---|---|---|
| | Z4L | Z4R | Z5L | Z5R | Z6L | Z6R |
| | Δiab < 0 | Δiab < 0 | Δiab < 0 | Δiab < 0 | Δiab ≤ 0 | Δiab > 0 |
| | Δibc > 0 | Δibc > 0 | Δibc ≥ 0 | Δibc < 0 | Δibc < 0 | Δibc < 0 |
| | Δica ≤ 0 | Δica > 0 | Δica > 0 | Δica > 0 | Δica > 0 | Δica > 0 |

Table 2 illustrates relationship between zones 1-3 and the signs of the first line current difference Δiab, the second line current difference Δibc, and the third line current difference Δica. Table 3 illustrates relationship between zones 4-6 and the signs of the first line current difference Δiab, the second line current difference Δibc, and the third line current difference Δica. For example, in the zone 1, if the first line current difference Δiab is larger than 0 (i.e. Δiab>0), the second line current difference Δibc is smaller than 0 (i.e. Δibc<0), and the third line current difference Δica is larger than or equal to 0 (i.e. Δica≥0), the second zone SZ may be determined in a left partial zone of the zone 1 (labeled as "Z1L" in FIG. 3). If the first line current difference Δiab is larger than 0 (i.e. Δiab≥0), the second line current difference Δibc is smaller than 0 (i.e. Δibc≤0), and the third line current difference Δica is smaller than 0 (i.e. Δica<0), the second zone SZ may be determined in a right partial zone of the zone 1 (labeled as "Z1R" in FIG. 3). For brevity, similar descriptions for Table 2 and Table 3 are not repeated in detail here.

In addition, a plurality of r functions r1-r12 may be defined for the 12 zones Z1L, Z1R, Z2L, Z2R, Z3L, Z3R, Z4L, Z4R, Z5L, Z5R, Z6L, and Z6R according to two of the three line current differences, respectively. For each of the plurality of r functions r1-r12, an absolute value of a ratio of the two of the three line current differences is calculated as a function value r by the processing circuit 106, where the function value r is involved in final value determination of the initial rotor position.

Figure 4:
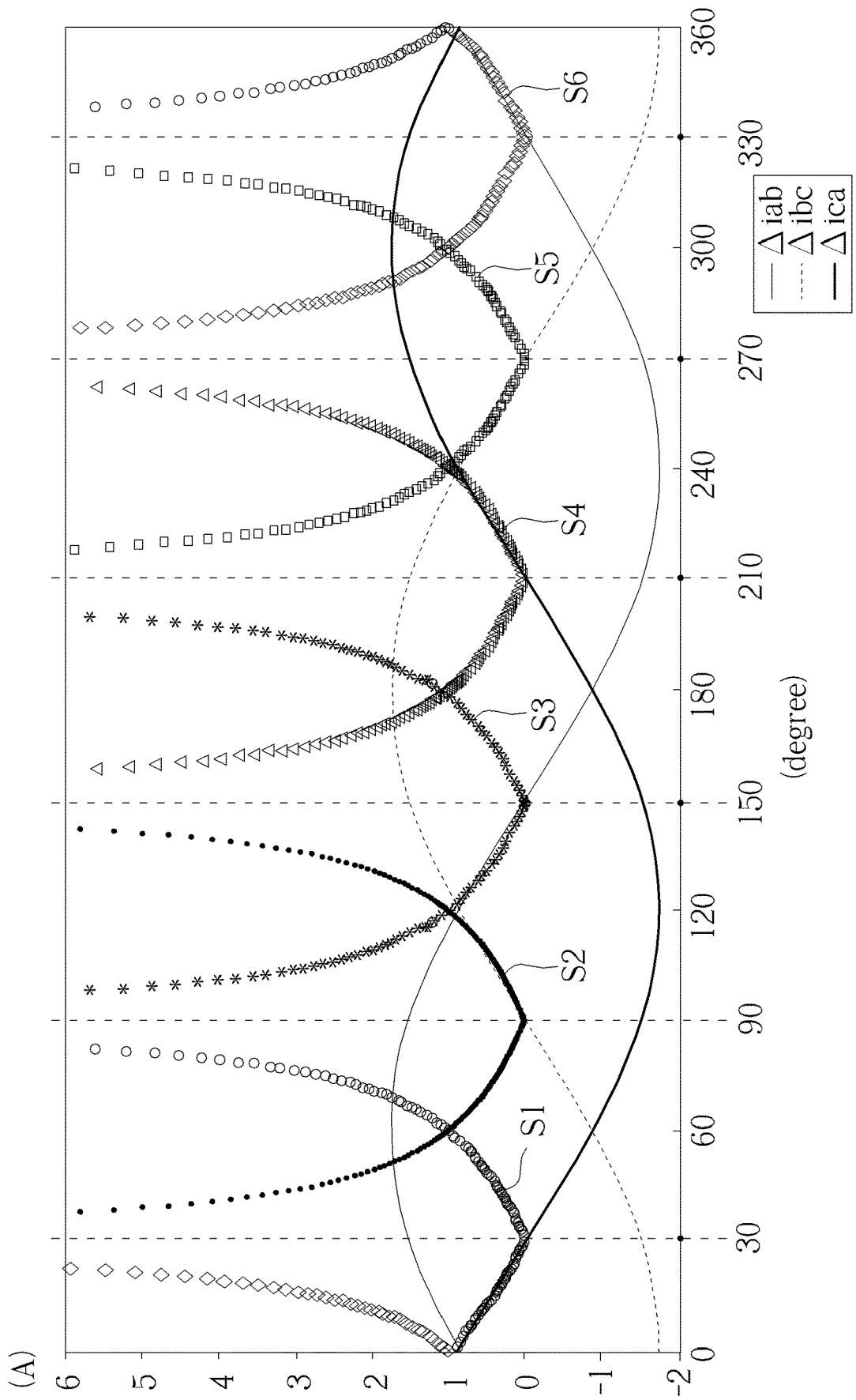
FIG. 4 is a diagram illustrating relationship between a plurality of r functions, three line current differences, and an initial rotor position of a PMSM according to an embodiment of the present invention.

FIG. 4 is a diagram illustrating relationship between the plurality of r functions r1-r12, three line current differences, and an initial rotor position of a PMSM according to an embodiment of the present invention. As shown in FIG. 4, a plurality of quadratic curves S1-S6 may correspond to two of the plurality of r functions r1-r12, respectively, wherein the quadratic curve S1 may correspond to r functions $$r1\left(r1 = \left|\frac{\Delta ica}{\Delta iab}\right|\right) \text{ and }$$

$$r2\left(r2 = \left|\frac{\Delta ica}{\Delta ibc}\right|\right),$$

the quadratic curve S2 may correspond to r functions $$r3\left(r3 = \left|\frac{\Delta ibc}{\Delta ica}\right|\right) \text{ and }$$

$$r4\left(r4 = \left|\frac{\Delta ibc}{\Delta iab}\right|\right),$$

the quadratic curve S3 may correspond to r functions $$r5\left(r5 = \left|\frac{\Delta iab}{\Delta ibc}\right|\right) \text{ and }$$

$$r6\left(r6 = \left|\frac{\Delta iab}{\Delta ica}\right|\right),$$

the quadratic curve S4 may correspond to r functions $$r7\left(r7 = \left|\frac{\Delta ica}{\Delta iab}\right|\right) \text{ and }$$

$$r8\left(r8 = \left|\frac{\Delta ica}{\Delta ibc}\right|\right),$$

the quadratic curve S5 may correspond to r functions $$r9\left(r9 = \left|\frac{\Delta ibc}{\Delta ica}\right|\right) \text{ and }$$

$$r10\left(r10 = \left|\frac{\Delta ibc}{\Delta iab}\right|\right),$$

and the quadratic curve S6 may correspond to r functions $$r11\left(r11 = \left|\frac{\Delta iab}{\Delta ibc}\right|\right) \text{ and }$$

$$r12\left(r12 = \left|\frac{\Delta iab}{\Delta ica}\right|\right).$$

It should be noted that, since the interference may be caused by sampling noise, the possible angle range of the initial rotor position of the PMSM for the three line current differences and the plurality of r functions r1-r12 is larger than 60 degrees. For example, in the zone 1, the original angle range 0-60 degrees is extended to an angle range −30-90 degrees (i.e. an angle range corresponding to the quadratic curve S1 in FIG. 4). In addition, the left partial zone of the zone 1 may correspond to an angle range −30-30 degrees (i.e. an angle range corresponding to the left half of the quadratic curve S1), and the right partial zone of the zone 1 may correspond to an angle range 30-90 degrees (i.e. an angle range corresponding to the right half of the quadratic curve S1). For brevity, similar descriptions for the zones 2-6 are not repeated in detail here.

TABLE 4

| Zone 1 | | Zone 2 | | Zone 3 | |
|---|---|---|---|---|---|
| Z1L | Z1R | Z2L | Z2R | Z3L | Z3R |
| $\Delta iab > 0$ $\Delta ibc < 0$ $\Delta ica \geq 0$ | $\Delta iab > 0$ $\Delta ibc < 0$ $\Delta ica < 0$ | $\Delta iab > 0$ $\Delta ibc \geq 0$ $\Delta ica < 0$ | $\Delta iab > 0$ $\Delta ibc > 0$ $\Delta ica < 0$ | $\Delta iab \geq 0$ $\Delta ibc > 0$ $\Delta ica < 0$ | $\Delta iab < 0$ $\Delta ibc > 0$ $\Delta ica < 0$ |
| $r1 = \left\|\dfrac{\Delta ica}{\Delta iab}\right\|$ | $r2 = \left\|\dfrac{\Delta ica}{\Delta ibc}\right\|$ | $r3 = \left\|\dfrac{\Delta ibc}{\Delta ica}\right\|$ | $r4 = \left\|\dfrac{\Delta ibc}{\Delta iab}\right\|$ | $r5 = \left\|\dfrac{\Delta iab}{\Delta ibc}\right\|$ | $r6 = \left\|\dfrac{\Delta iab}{\Delta ica}\right\|$ |
| [−30, 30] | [30, 90] | [30, 90] | [90, 150] | [90, 150] | [150, 210] |

TABLE 5

| Zone 4 | | Zone 5 | | Zone 6 | |
|---|---|---|---|---|---|
| Z4L | Z4R | Z5L | Z5R | Z6L | Z6R |
| $\Delta iab < 0$ $\Delta ibc > 0$ $\Delta ica \leq 0$ | $\Delta iab < 0$ $\Delta ibc > 0$ $\Delta ica > 0$ | $\Delta iab < 0$ $\Delta ibc \geq 0$ $\Delta ica > 0$ | $\Delta iab < 0$ $\Delta ibc < 0$ $\Delta ica > 0$ | $\Delta iab \geq 0$ $\Delta ibc < 0$ $\Delta ica > 0$ | CV $\Delta iab > 0$ $\Delta ibc < 0$ $\Delta ica > 0$ |
| $r7 = \left\|\dfrac{\Delta ica}{\Delta iab}\right\|$ | $r8 = \left\|\dfrac{\Delta ica}{\Delta ibc}\right\|$ | $r9 = \left\|\dfrac{\Delta ibc}{\Delta ica}\right\|$ | $r10 = \left\|\dfrac{\Delta ibc}{\Delta iab}\right\|$ | $r11 = \left\|\dfrac{\Delta iab}{\Delta ibc}\right\|$ | $r12 = \left\|\dfrac{\Delta iab}{\Delta ica}\right\|$ |
| [150, 210] | [210, 270] | [210, 270] | [270, 330] | [270, 330] | [330, 30] |

Table 4 illustrates relationship between zones 1-3 and the plurality of r functions r1-r6. Table 5 illustrates relationship between zones 4-6 and the plurality of r functions r7-r12. For example, in the left partial zone of the zone 1 (labeled as "Z1L"), an absolute value of a ratio of the third line current difference Δica to the first line current difference Δiab is calculated as the function value r $$\left(\text{i.e. } r = \left|\dfrac{\Delta ica}{\Delta iab}\right|\right)$$

according to the r function r1, and the left partial zone of the zone 1 may correspond to an angle range −30-30 degrees (labeled as "[−30, 30]"). In the right partial zone of the zone 1 (labeled as "Z1R"), an absolute value of a ratio of the third line current difference Δica to the second line current difference Δibc is calculated as the function value r $$\left(\text{i.e. } r = \left|\dfrac{\Delta ica}{\Delta ibc}\right|\right)$$

according to the r function r2, and the right partial zone of the zone 1 may correspond to an angle range 30-90 degrees (labeled as "[30, 90]"). For brevity, similar descriptions for Table 4 and Table 5 are not repeated in detail here.

After the second zone SZ is determined as one of the 12 zones and the function value r corresponding to the second zone SZ is calculated, a threshold setting may be set by the processing circuit 106, and the processing circuit 106 may determine a final value of the initial rotor position of the PMSM 100 according to the threshold setting and the function value r. For example, the threshold setting may include an upper limit value β and a lower limit value α, wherein the upper limit value β may be fine-tuned around 3 and the lower limit value α may be fine-tuned around 0.5, depending upon the amount of noise during actual operation.

Figure 5:
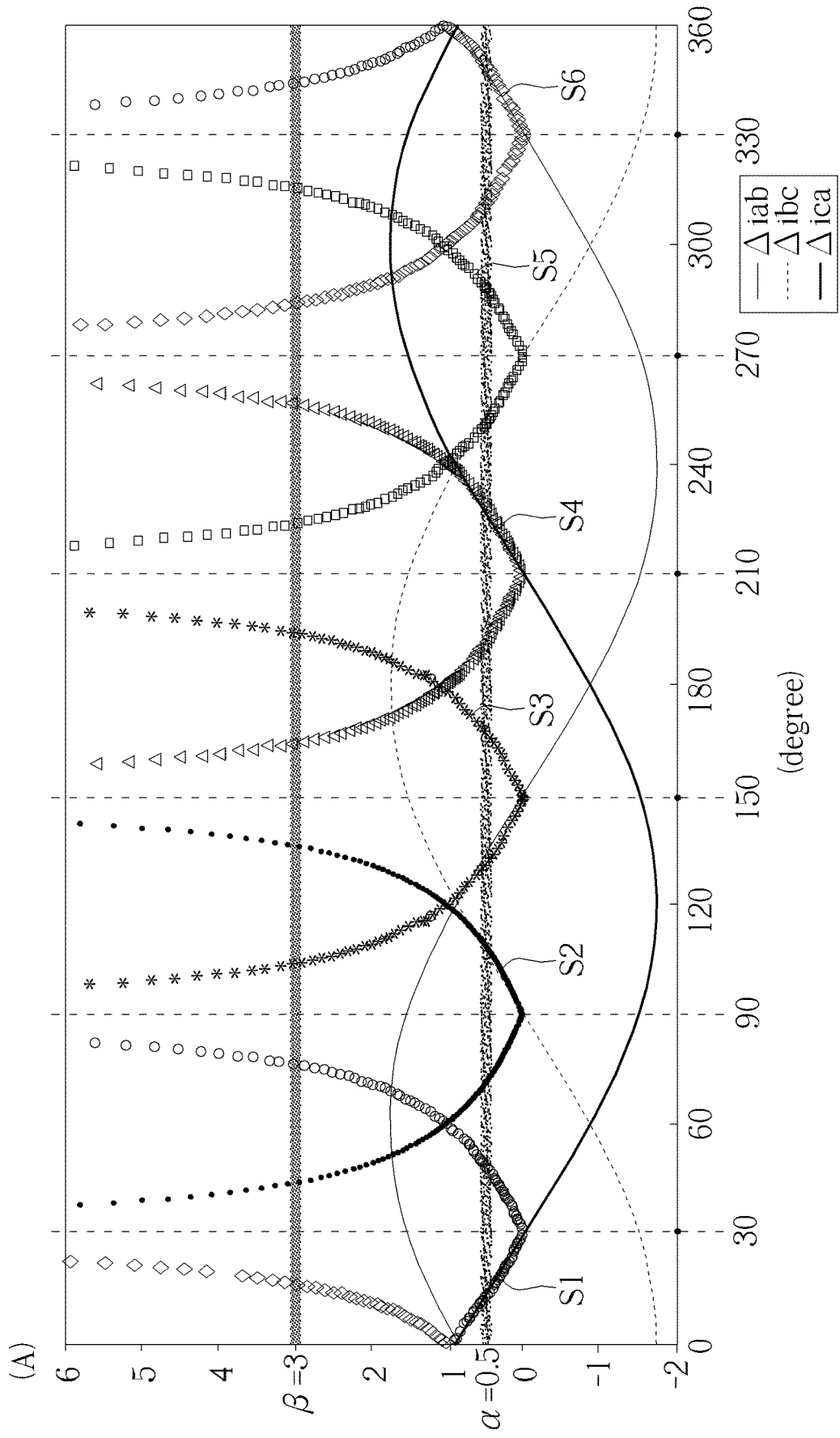
FIG. 5 is a diagram illustrating relationship between the plurality of r functions, the three line current differences, and the initial rotor position of the PMSM shown in FIG. 4 with an upper limit value and a lower limit value according to an embodiment of the present invention.

FIG. 5 is a diagram illustrating relationship between the plurality of r functions r1-r12, the three line current differences, and the initial rotor position of the PMSM shown in FIG. 4 with the upper limit value β and the lower limit value α according to an embodiment of the present invention. As shown in FIG. 5, the lower limit value α may be set as 0.5, and the upper limit value β may be set as 3, but the present invention is not limited thereto. The function value r is compared with the lower limit value α and the upper limit value β to generate a comparison result, and the initial rotor position of the PMSM may be determined according to the comparison result.

TABLE 6

| Zone 1 $\Delta ia \geq 0$, $\Delta ib < 0$, and $\Delta ic > 0$ | | | | | |
|---|---|---|---|---|---|
| Z1L $\Delta iab > 0$, $\Delta ibc < 0$, and $\Delta ica \geq 0$ [−30, 30] | | | Z1R $\Delta iab > 0$, $\Delta ibc < 0$, and $\Delta ica < 0$ [30, 90] | | |
| $\left\|\dfrac{\Delta ica}{\Delta iab}\right\|$ | | | $\left\|\dfrac{\Delta ica}{\Delta ibc}\right\|$ | | |
| $r \leq \alpha$ | $\alpha < r \leq \beta$ | $r > \beta$ | $r \leq \alpha$ | $\alpha < r \leq \beta$ | $r > \beta$ |
| 30 Degrees | 0 degrees | −30 degrees | 30 degrees | 60 degrees | 90 degrees |

Table 6 illustrates relationship between the initial rotor position of the PMSM and the comparison result of the function value r, the lower limit value α, and the upper limit value β for the zone 1 (which includes the left partial zone Z1L and the right partial zone Z1R), where the zone 1 may be selected as the first zone FZ according to the phase current differences, and one of the left partial zone Z1L and the right partial zone Z1R may be selected as the second zone SZ according to the line current differences. In response to the second zone SZ being determined as the left partial zone of the zone 1 (i.e. Z1L), if the function value r is smaller than or equal to the lower limit value α (i.e. r≤α), the initial rotor position of the PMSM is determined to have an upper limit angle (i.e. 30 degrees) of the angle range −30-30 degrees corresponding to the left partial zone of the zone 1; if the function value r is larger than the lower limit value α and smaller than or equal to the upper limit value β (i.e. α<r≤β), the initial rotor position of the PMSM is determined to have a middle angle (i.e. 0 degrees) of the upper limit angle (i.e. 30 degrees) and a lower limit angle (i.e. −30 degrees) of the angle range −30-30 degrees; and if the function value r is larger than the upper limit value β (i.e. r>β), the initial rotor position of the PMSM is determined to have the lower limit angle (i.e. −30 degrees).

In response to the second zone SZ being determined as the right partial zone of the zone 1 (i.e. Z1R), if the function value r is smaller than or equal to the lower limit value α (i.e. r≤α), the initial rotor position of the PMSM is determined to have a lower limit angle (i.e. 30 degrees) of the angle range 30-90 degrees corresponding to the right partial zone of the zone 1; if the function value r is larger than the lower limit value α and smaller than or equal to the upper limit value β (i.e. α<r≤β), the initial rotor position of the PMSM is determined to have a middle angle (i.e. 60 degrees) of the lower limit angle (i.e. 30 degrees) and an upper limit angle (i.e. 90 degrees) of the angle range 30-90 degrees; and if the function value r is larger than the upper limit value β (i.e. r>β), the initial rotor position of the PMSM is determined to have the upper limit angle (i.e. 90 degrees).

TABLE 7

| Zone 2 $\Delta ia > 0$, $\Delta ib < 0$, and $\Delta ic \leq 0$ | | | | | |
|---|---|---|---|---|---|
| Z2L $\Delta iab > 0$, $\Delta ibc \leq 0$, and $\Delta ica < 0$ [30, 90] | | | Z2R $\Delta iab > 0$, $\Delta ibc > 0$, and $\Delta ica < 0$ [90, 150] | | |
| $\left\|\dfrac{\Delta ibc}{\Delta ica}\right\|$ | | | $\left\|\dfrac{\Delta ibc}{\Delta iab}\right\|$ | | |
| $r \leq \alpha$ | $\alpha < r \leq \beta$ | $r > \beta$ | $r \leq \alpha$ | $\alpha < r \leq \beta$ | $r > \beta$ |
| 90 Degrees | 60 degrees | 30 degrees | 90 degrees | 120 degrees | 150 degrees |

Table 7 illustrates relationship between the initial rotor position of the PMSM and a comparison result of the function value r, the lower limit value α, and the upper limit value β for the zone 2 (which includes the left partial zone Z2L and the right partial zone Z2R), where the zone 2 may be selected as the first zone FZ according to the phase current differences, and one of the left partial zone Z2L and the right partial zone Z2R may be selected as the second zone SZ according to the line current differences. In response to the second zone SZ being determined as the left partial zone of the zone 2 (i.e. Z2L), if the function value r is smaller than or equal to the lower limit value α (i.e. r≤α), the initial rotor position of the PMSM is determined to have an upper limit angle (i.e. 90 degrees) of the angle range 30-90 degrees corresponding to the left partial zone of the zone 2; if the function value r is larger than the lower limit value α and smaller than or equal to the upper limit value β (i.e. α<r≤β), the initial rotor position of the PMSM is determined to have a middle angle (i.e. 60 degrees) of the upper limit angle (i.e. 90 degrees) and a lower limit angle (i.e. 30 degrees) of the angle range 30-90 degrees; and if the function value r is larger than the upper limit value β (i.e. r>β), the initial rotor position of the PMSM is determined to have the lower limit angle (i.e. 30 degrees).

In response to the second zone SZ being determined as the right partial zone of the zone 2 (i.e. Z2R), if the function value r is smaller than or equal to the lower limit value α (i.e. r≤α), the initial rotor position of the PMSM is determined to have a lower limit angle (i.e. 90 degrees) of the angle range 90-150 degrees corresponding to the right partial zone of the zone 2; if the function value r is larger than the lower limit value α and smaller than or equal to the upper limit value β (i.e. α<r≤β), the initial rotor position of the PMSM is determined to have a middle angle (i.e. 120 degrees) of the lower limit angle (i.e. 90 degrees) and an upper limit angle (i.e. 150 degrees) of the angle range 90-150 degrees; and if the function value r is larger than the upper limit value β (i.e. r>β), the initial rotor position of the PMSM is determined to have the upper limit angle (i.e. 150 degrees).

TABLE 8

| Zone 3 $\Delta ia > 0$, $\Delta ib \geq 0$, and $\Delta ic < 0$ | | | | | |
|---|---|---|---|---|---|
| Z3L $\Delta iab \geq 0$, $\Delta ibc > 0$, and $\Delta ica < 0$ [90, 150] | | | Z3R $\Delta iab < 0$, $\Delta ibc > 0$, and $\Delta ica < 0$ [150, 210] | | |
| $\left\|\dfrac{\Delta iab}{\Delta ibc}\right\|$ | | | $\dfrac{\Delta iab}{\Delta ica}$ | | |
| $r \leq \alpha$ | $\alpha < r \leq \beta$ | $r > \alpha$ | $r \leq \alpha$ | $\alpha < r \leq \beta$ | $r > \beta$ |
| 150 degrees | 120 degrees | 90 degrees | 150 degrees | 180 degrees | 210 degrees |

Table 8 illustrates relationship between the initial rotor position of the PMSM and a comparison result of the function value r, the lower limit value α, and the upper limit value β for the zone 3 (which includes the left partial zone Z3L and the right partial zone Z3R), where the zone 3 may be selected as the first zone FZ according to the phase current differences, and one of the left partial zone Z3L and the right partial zone Z3R may be selected as the second zone SZ according to the line current differences. In response to the second zone SZ being determined as the left partial zone of the zone 3 (i.e. Z3L), if the function value r is smaller than or equal to the lower limit value α (i.e. r≤α), the initial rotor position of the PMSM is determined to have an upper limit angle (i.e. 150 degrees) of the angle range 90-150 degrees corresponding to the left partial zone of the zone 3; if the function value r is larger than the lower limit value α and smaller than or equal to the upper limit value β (i.e. α<r≤β), the initial rotor position of the PMSM is determined to have a middle angle (i.e. 120 degrees) of the upper limit angle (i.e. 150 degrees) and a lower limit angle (i.e. 90 degrees) of the angle range 90-150 degrees; and if the function value r is larger than the upper limit value β (i.e. r>β), the initial rotor position of the PMSM is determined to have the lower limit angle (i.e. 90 degrees).

In response to the second zone SZ being determined as the right partial zone of the zone 3 (i.e. Z3R), if the function value r is smaller than or equal to the lower limit value α (i.e. r≤α), the initial rotor position of the PMSM is determined to have a lower limit angle (i.e. 150 degrees) of the angle range 150-210 degrees corresponding to the right partial zone of the zone 3; if the function value r is larger than the lower limit value α and smaller than or equal to the upper limit value β (i.e. α<r≤β), the initial rotor position of the PMSM is determined to have a middle angle (i.e. 180 degrees) of the lower limit angle (i.e. 150 degrees) and an upper limit angle (i.e. 210 degrees) of the angle range 150-210 degrees; and if the function value r is larger than the upper limit value β (i.e. r>β), the initial rotor position of the PMSM is determined to have the upper limit angle (i.e. 210 degrees).

TABLE 9

Zone 4
Δia ≤ 0, Δib > 0, and Δic < 0

| Z4L Δiab < 0, Δibc > 0, and Δica ≤ 0 [150, 210] | | | Z4R Δiab < 0, Δibc > 0, and Δica > 0 [210, 270] | | |
|---|---|---|---|---|---|
| $\left|\dfrac{\Delta ica}{\Delta iab}\right|$ | | | $\dfrac{\Delta ica}{\Delta ibc}$ | | |
| r ≤ α | α < r ≤ β | r > β | r ≤ α | α < r ≤ β | r > β |
| 210 degrees | 180 degrees | 150 degrees | 210 degrees | 240 degrees | 270 degrees |

Table 9 illustrates relationship between the initial rotor position of the PMSM and a comparison result of the function value r, the lower limit value α, and the upper limit value β for the zone 4 (which includes the left partial zone Z4L and the right partial zone Z4R), where the zone 4 may be selected as the first zone FZ according to the phase current differences, and one of the left partial zone Z4L and the right partial zone Z4R may be selected as the second zone SZ according to the line current differences. In response to the second zone SZ being determined as the left partial zone of the zone 4 (i.e. Z4L), if the function value r is smaller than or equal to the lower limit value α (i.e. r≤α), the initial rotor position of the PMSM is determined to have an upper limit angle (i.e. 210 degrees) of the angle range 150-210 degrees corresponding to the left partial zone of the zone 4; if the function value r is larger than the lower limit value α and smaller than or equal to the upper limit value β (i.e. α<r≤β), the initial rotor position of the PMSM is determined to have a middle angle (i.e. 180 degrees) of the upper limit angle (i.e. 210 degrees) and a lower limit angle (i.e. 150 degrees) of the angle range 150-210 degrees; and if the function value r is larger than the upper limit value β (i.e. r>β), the initial rotor position of the PMSM is determined to have the lower limit angle (i.e. 150 degrees).

In response to the second zone SZ being determined as the right partial zone of the zone 4 (i.e. Z4R), if the function value r is smaller than or equal to the lower limit value α (i.e. r≤α), the initial rotor position of the PMSM is determined to have a lower limit angle (i.e. 210 degrees) of the angle range 210-270 degrees corresponding to the right partial zone of the zone 4; if the function value r is larger than the lower limit value α and smaller than or equal to the upper limit value β (i.e. α<r≤β), the initial rotor position of the PMSM is determined to have a middle angle (i.e. 240 degrees) of the lower limit angle (i.e. 210 degrees) and an upper limit angle (i.e. 270 degrees) of the angle range 210-270 degrees; and if the function value r is larger than the upper limit value β (i.e. r>β), the initial rotor position of the PMSM is determined to have the upper limit angle (i.e. 270 degrees).

TABLE 10

Zone 5
Δia < 0, Δib > 0, and Δic ≤ 0

| Z5L Δiab < 0, Δibc > 0, and Δica ≥ 0 [210, 270] | | | Z5R Δiab < 0, Δibc < 0, and Δica > 0 [270, 330] | | |
|---|---|---|---|---|---|
| $\left|\dfrac{\Delta ibc}{\Delta ica}\right|$ | | | $\left|\dfrac{\Delta ibc}{\Delta iab}\right|$ | | |
| r ≤ α | α < r ≤ β | r > β | r ≤ α | α < r ≤ β | r > β |
| 270 degrees | 240 degrees | 210 degrees | 270 degrees | 300 degrees | 330 degrees |

Table 10 illustrates relationship between the initial rotor position of the PMSM and a comparison result of the function value r, the lower limit value α, and the upper limit value β for the zone 5 (which includes the left partial zone Z5L and the right partial zone Z5R), where the zone 5 may be selected as the first zone FZ according to the phase current differences, and one of the left partial zone Z5L and the right partial zone Z5R may be selected as the second zone SZ according to the line current differences. In response to the second zone SZ being determined as the left partial zone of the zone 5 (i.e. Z5L), if the function value r is smaller than or equal to the lower limit value α (i.e. r≤α), the initial rotor position of the PMSM is determined to have an upper limit angle (i.e. 270 degrees) of the angle range 210-270 degrees corresponding to the left partial zone of the zone 5; if the function value r is larger than the lower limit value α and smaller than or equal to the upper limit value β (i.e. α<r≤β), the initial rotor position of the PMSM is determined to have a middle angle (i.e. 240 degrees) of the upper limit angle (i.e. 270 degrees) and a lower limit angle (i.e. 210 degrees) of the angle range 210-270 degrees; and if the function value r is larger than the upper limit value β (i.e. r>β), the initial rotor position of the PMSM is determined to have the lower limit angle (i.e. 210 degrees).

In response to the second zone SZ being determined as the right partial zone of the zone 5 (i.e. Z5R), if the function value r is smaller than or equal to the lower limit value α (i.e. r≤α), the initial rotor position of the PMSM is determined to have a lower limit angle (i.e. 270 degrees) of the angle range 270-330 degrees corresponding to the right partial zone of the zone 5; if the function value r is larger than the lower limit value α and smaller than or equal to the upper limit value β (i.e. α<r≤β), the initial rotor position of the PMSM is determined to have a middle angle (i.e. 300 degrees) of the lower limit angle (i.e. 270 degrees) and an upper limit angle (i.e. 330 degrees) of the angle range 270-330 degrees; and if the function value r is larger than the upper limit value β(i.e. r>β), the initial rotor position of the PMSM is determined to have the upper limit angle (i.e. 330 degrees).

TABLE 11

Zone 6
Δia < 0, Δib ≤ 0, and Δic > 0

| Z6L Δiab ≤ 0, Δibc < 0, and Δica > 0 [270, 330] | | | Z6R Δiab > 0, Δibc < 0, and Δica > 0 [330, 30] | | |
|---|---|---|---|---|---|
| $\left|\dfrac{\Delta iab}{\Delta ibc}\right|$ | | | $\left|\dfrac{\Delta iab}{\Delta ica}\right|$ | | |
| r ≤ α | α < r ≤ β | r > β | r ≤ α | α < r ≤ β | r > β |
| 330 degrees | 300 degrees | 270 degrees | 330 degrees | 360 degrees | 30 degrees |

Table 11 illustrates relationship between the initial rotor position of the PMSM and a comparison result of the function value r, the lower limit value α, and the upper limit value β for the zone 6 (which includes the left partial zone Z6L and the right partial zone Z6R), where the zone 6 may be selected as the first zone FZ according to the phase current differences, and one of the left partial zone Z6L and the right partial zone Z6R may be selected as the second zone SZ according to the line current differences. In response to the second zone SZ being determined as the left partial zone of the zone 6 (i.e. Z6L), if the function value r is smaller than or equal to the lower limit value α (i.e. r≤α), the initial rotor position of the PMSM is determined to have an upper limit angle (i.e. 330 degrees) of the angle range 270-330 degrees corresponding to the left partial zone of the zone 6; if the function value r is larger than the lower limit value α and smaller than or equal to the upper limit value β (i.e. α<r≤β), the initial rotor position of the PMSM is determined to have a middle angle (i.e. 300 degrees) of the upper limit angle (i.e. 330 degrees) and a lower limit angle (i.e. 270 degrees) of the angle range 270-330 degrees; and if the function value r is larger than the upper limit value β (i.e. r>β), the initial rotor position of the PMSM is determined to have the lower limit angle (i.e. 270 degrees).

In response to the second zone SZ being determined as the right partial zone of the zone 6 (i.e. Z6R), if the function value r is smaller than or equal to the lower limit value α (i.e. r≤α), the initial rotor position of the PMSM is determined to have a lower limit angle (i.e. 330 degrees) of the angle range 330-30 degrees corresponding to the right partial zone of the zone 6; if the function value r is larger than the lower limit value α and smaller than or equal to the upper limit value β (i.e. α<r≤β), the initial rotor position of the PMSM is determined to have a middle angle (i.e. 360 degrees) of the lower limit angle (i.e. 330 degrees) and an upper limit angle (i.e. 30 degrees) of the angle range 330-30 degrees; and if the function value r is larger than the upper limit value β (i.e. r>β), the initial rotor position of the PMSM is determined to have the upper limit angle (i.e. 30 degrees).

Figure 6:
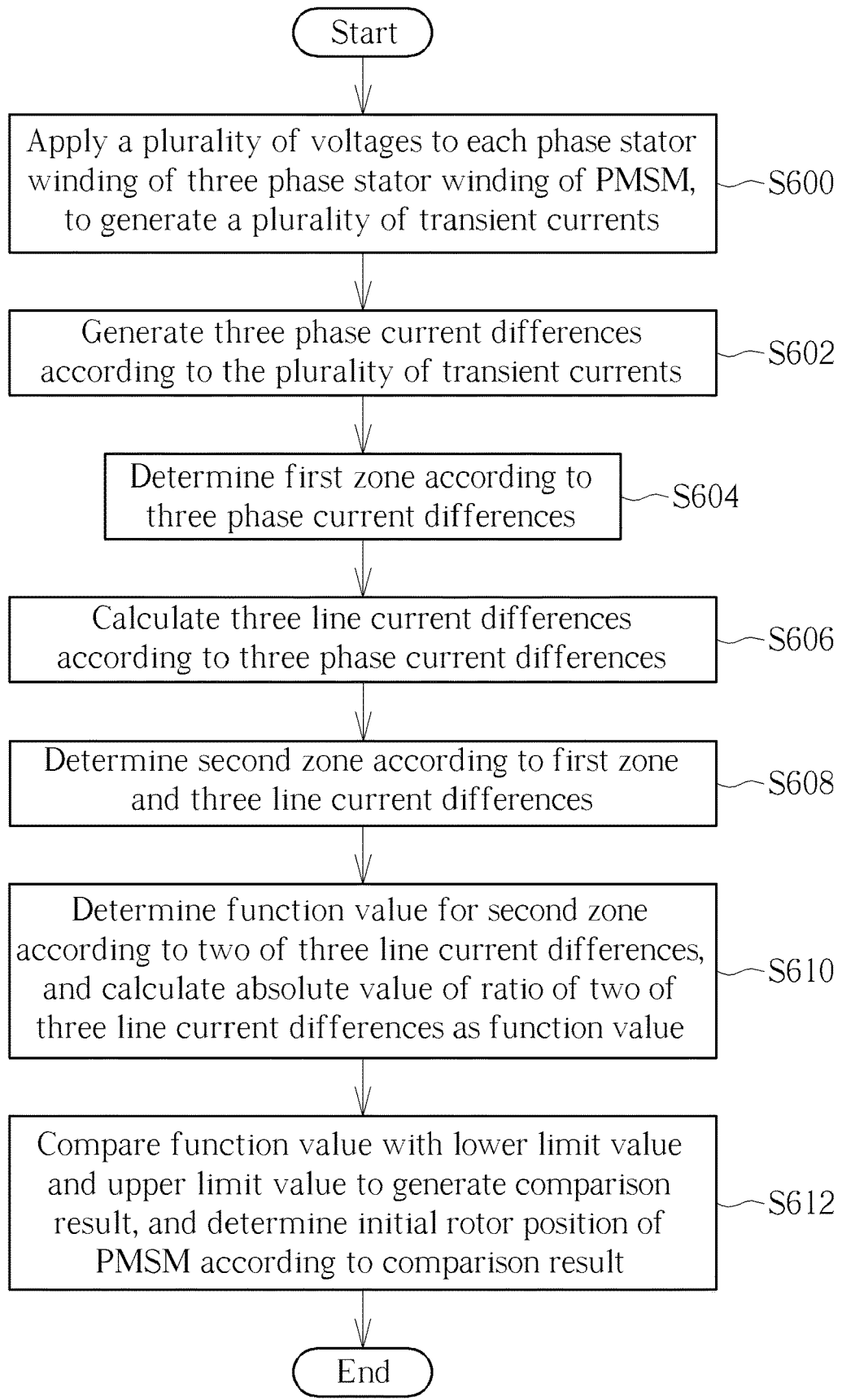
FIG. 6 is a flow chart illustrating a method for determining an initial rotor position of a PMSM according to an embodiment of the present invention.

FIG. 6 is a flow chart illustrating a method for determining an initial rotor position of a PMSM according to an embodiment of the present invention. Provided that the result is substantially the same, the steps are not required to be executed in the exact order shown in FIG. 6. For example, the method shown in FIG. 6 may be employed by the PMSM 100. Specifically, the method shown in FIG. 6 may be performed and/or controlled by the processing circuit 106 shown in FIG. 1.

In Step S600, a plurality of voltages are applied to each phase stator winding of the three phase stator winding of the PMSM 100, to generate a plurality of transient currents.

In Step S602, three phase current differences is generated according to the plurality of transient currents.

In Step S604, the first zone FZ is determined according to the three phase current differences.

In Step S606, three line current differences is calculated according to the three phase current differences.

In Step S608, the second zone SZ is determined according to the first zone FZ and the three line current differences.

In Step S610, the function value r for the second zone SZ is determined according to two of the three line current differences, and an absolute value of a ratio of said two of the three line current differences is calculated as the function value r.

In Step S612, the function value r is compared with the lower limit value α and the upper limit value β to generate a comparison result, and the initial rotor position of the PMSM 100 is determined according to the comparison result.

Since a person skilled in the pertinent art can readily understand details of the steps after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining an initial rotor position of a permanent magnet synchronous motor (PMSM), comprising:
generating a plurality of transient currents by applying a plurality of voltages to each phase stator winding of a three phase stator winding of the PMSM;
generating three phase current differences according to the plurality of transient currents;
determining a first zone in which the initial rotor position of the PMSM is located according to the three phase current differences, wherein angles between 0-360 degrees are divided into a plurality of zones, and the first zone is selected from the plurality of zones;
calculating three line current differences according to the three phase current differences; and
determining a second zone in which the initial rotor position of the PMSM is located according to the first zone and the three line current differences, wherein the second zone is a portion of the first zone;
determining a function value for the second zone according to two of the three line current differences;
comparing the function value with a threshold setting to generate a comparison result; and
determining the initial rotor position of the PMSM according to the comparison result.

2. The method of claim 1, wherein the three phase current differences comprises a first phase current difference, a second phase current difference, and a third phase current difference, and calculating the three line current differences according to the three phase current differences comprises:
subtracting the second phase current difference from the first phase current difference, to generate a first line current difference;
subtracting the third phase current difference from the second phase current difference, to generate a second line current difference; and
subtracting the first phase current difference from the third phase current difference, to generate a third line current difference;
wherein the three line current differences comprises the first line current difference, the second line current difference, and the third line current difference.

3. The method of claim 1, wherein the angles between 0-360 degrees are divided into six zones, the first zone is a 60-degree zone comprising a left 30-degree partial zone and a right 30-degree partial zone, and the second zone is one of the left 30-degree partial zone and the right 30-degree partial zone.

4. The method of claim 1, wherein determining the function value for the second zone according to two of the three line current differences comprises:
calculating an absolute value of a ratio of said two of the three line current differences as the function value.

5. The method of claim 1, wherein the threshold setting comprises an upper limit value and a lower limit value.

6. The method of claim 5, wherein the first zone comprises a left partial zone and a right partial zone; in response to the second zone being the left partial zone, if the function value is smaller than or equal to the lower limit value, the initial rotor position of the PMSM is determined to have an upper limit angle of an angle range, where the angle range corresponds to the left partial zone of the first zone; if the function value is larger than the lower limit value and smaller than or equal to the upper limit value, the initial rotor position of the PMSM is determined to have a middle angle of the upper limit angle and a lower limit angle of the angle range; and if the function value is larger than the upper limit value, the initial rotor position of the PMSM is determined to have the lower limit angle.

7. The method of claim 5, wherein the first zone comprises a left partial zone and a right partial zone; in response to the second zone being the right partial zone, if the function value is smaller than or equal to the lower limit value, the initial rotor position of the PMSM is determined to have a lower limit angle of an angle range, where the angle range corresponds to the right partial zone of the first zone; if the function value is larger than the lower limit value and smaller than or equal to an upper limit value of the angle range, the initial rotor position of the PMSM is determined to have a middle angle of the upper limit angle and the lower limit angle; and if the function value is larger than the upper limit value, the initial rotor position of the PMSM is determined to have the upper limit angle.

8. A motor device comprising:
  a permanent magnet synchronous motor (PMSM); and
  a processing circuit, coupled to the PMSM and arranged to:
  apply a plurality of voltages to each phase stator winding of a three phase stator winding of the PMSM, to obtain a plurality of transient currents from the PMSM;
  generate three phase current differences according to the plurality of transient currents;
  determine a first zone in which an initial rotor position of the PMSM is located according to the three phase current differences, wherein angles between 0-360 degrees are divided into a plurality of zones, and the first zone is selected from the plurality of zones;
  calculate three line current differences according to the three phase current differences; and
  determine a second zone in which the initial rotor position of the PMSM is located according to the first zone and the three line current differences, wherein the second zone is a portion of the first zone;
  determine a function value for the second zone according to two of the three line current differences;
  compare the function value with a threshold setting to generate a comparison result; and
  determine the initial rotor position of the PMSM according to the comparison result.

* * * * *